US011783690B1

(12) United States Patent
Blair (10) Patent No.: US 11,783,690 B1
(45) Date of Patent: Oct. 10, 2023

(54) SYSTEM AND METHOD FOR MULTI-USER SECURITY MONITORING AND REMOTE NOTARIZATION

(71) Applicant: Keesha Blair, Woodbridge, VA (US)

(72) Inventor: Keesha Blair, Woodbridge, VA (US)

( * ) Notice: Subject to any disclaimer, the term of this patent is extended or adjusted under 35 U.S.C. 154(b) by 46 days.

(21) Appl. No.: 17/672,773

(22) Filed: Feb. 16, 2022

(51) Int. Cl.
*G08B 21/02* (2006.01)
*G08B 21/10* (2006.01)

(52) U.S. Cl.
CPC ....... *G08B 21/0208* (2013.01); *G08B 21/028* (2013.01); *G08B 21/0241* (2013.01); *G08B 21/10* (2013.01)

(58) Field of Classification Search
CPC ............ G08B 21/0208; G08B 21/0241; G08B 21/028; G08B 21/10
See application file for complete search history.

(56) References Cited

U.S. PATENT DOCUMENTS

| | | | | |
|---|---|---|---|---|
| 2007/0260888 A1* | 11/2007 | Giobbi | ............. | G06Q 20/40145 713/186 |
| 2008/0028455 A1* | 1/2008 | Hatter | ................... | G06Q 20/389 726/10 |
| 2009/0049298 A1* | 2/2009 | Hatter | ................... | H04L 9/3231 713/176 |
| 2009/0327144 A1* | 12/2009 | Hatter | ................... | H04L 9/3231 340/5.82 |
| 2013/0297943 A1* | 11/2013 | Hackler | ................ | H04L 9/3247 713/178 |
| 2015/0281362 A1* | 10/2015 | Shanmugam | ....... | H04L 63/0892 709/217 |
| 2015/0381624 A1* | 12/2015 | Reiter | ................. | G06F 21/6245 713/168 |
| 2016/0217422 A1* | 7/2016 | Dujisin | ................ | G06Q 10/103 |
| 2017/0076411 A1* | 3/2017 | Mao | ..................... | G06Q 50/265 |
| 2018/0218339 A1* | 8/2018 | Jenkins | ............... | G06Q 30/018 |
| 2019/0130416 A1* | 5/2019 | Boudville | .......... | G06Q 20/1085 |
| 2022/0058287 A1* | 2/2022 | Hirson | .................. | G06F 21/316 |
| 2022/0100905 A1* | 3/2022 | Hardy | ..................... | H04L 63/12 |
| 2022/0284526 A1* | 9/2022 | Hardy | .................. | H04L 67/141 |
| 2022/0300888 A1* | 9/2022 | Benson | .......... | G06Q 10/063116 |

* cited by examiner

*Primary Examiner* — Curtis J King
(74) *Attorney, Agent, or Firm* — John Rizvi; John Rizvi, P.A.-The Patent Professor®

(57) ABSTRACT

A system and method for multi-user security monitoring and remote notarization provides image capturing devices allow legal guardians to remotely observe and communicate with dependents in real time. The image capturing device comprises a motion and voice activated lens that articulates to follow and capture the image and sound of the dependent. The image capturing device is configured with a two-way communication network that allows for communications between the legal guardians and the dependent. An algorithm is programmable to control articulation of the motion and voice activated lens of the image capturing device. A password manager generates a unique password for the legal guardians to enable access to the image capturing device. A predetermined noise capturing device and an airborne residue capturing device relay emergency messages upon detection of predetermined noise and residue. Remote notarization units allow for generation, verification, and recorded collection of signatory data between signatory and notary.

20 Claims, 3 Drawing Sheets

SYSTEM AND METHOD FOR MULTI-USER SECURITY MONITORING AND REMOTE NOTARIZATION

FIELD OF THE INVENTION

The present invention relates generally to a system and method for multi-user security monitoring and remote notarization, and more particularly, to a system and method that provides a network of image capturing devices that allow multiple legal guardians, first responders or a central monitoring center to remotely observe and communicate with a dependent in real time through multiple communication devices; and provides a predetermined noise and residue capturing device that allows for the detection of predetermined noise signals and airborne residue in the proximity of the dependent, so as to trigger a message to an emergency responder in the event of an active threat or crime in progress; and further provides multiple remote notarization units that allow for generation and recorded collection of signatory data for remote electronic notary transactions in real time.

BACKGROUND OF THE INVENTION

Traditionally, once a dependent is left to the care of a school, day care center, elderly home, etc., the legal guardian has no way to inconspicuously monitor the dependent and behavior from remote locations. Nor does the legal guardian have a way to remotely view and communicate with the dependent, and vice versa. However, it is known in the art that legal guardians have a need to view the quality of care their loved ones receive. Further, legal guardians also have the right to observe the people they have entrusted to care for their loved ones. Unfortunately, current surveillance options are not accessible to the legal guardians. And current cameras and security systems do not offer unique multi-user login accounts for multiple legal guardians.

Typically, legal documents require an authentication of a signature by a licensed notary who performs acts in legal affairs, in particular witnessing signatures on documents. Such authentication of a signature by the notary requires a personal appearance before the notary. The notary personally witnesses the execution of the signature, inspects identity documents to verify the identity of the person executing the signature, and affixes a notary statement and seal to the signed document. Such notarization of the signature provides a level of assurance that the document was in fact executed by the person identified by the signature. This helps to prevent unauthorized signatures and repudiation of the signed instrument by the signer. It is also known in the art that digital signature technology performs substantially the same functions of a handwritten signature. Further, such electronic signatures can produce evidence of the integrity of the signatory and a signed electronic document that is more reliable than the traditional handwritten signature.

Generally, emergency alarm systems include burglar alarms, smoke detectors, intrusion detectors, and the like. The emergency alarms often do not include an efficient means to program the different alarm settings. These alarm systems are connected to an external unit, such as a central monitoring center, or an emergency response unit. However, these alarm systems often do not allow for real time, two-way communications with the central monitoring center or emergency response units.

Accordingly, there is an established need for a system and method for multi-user security monitoring and remote notarization that allows a legal guardian to monitor and communicate with a dependent in real time; relays an emergency message to an emergency responder upon detection of a predetermined noise and an airborne residue near the dependent; and enables verifiable and recordable remote notarization between a signatory and a notary.

SUMMARY OF THE INVENTION

The present invention is directed to a system and method for multi-user security monitoring and remote notarization. The system and method provides a network of image capturing devices that allow one or more legal guardians, first responders or central monitoring centers to remotely observe and communicate with a dependent in real time. The image capturing device can include a motion and voice activated lens that articulates to follow and captures the image and sound of the dependent. The image capturing device is configured with a two-way communication network, and a one-way communication network that work together to enable selective communication protocols between the legal guardians and the dependent. An algorithm is programmable to control articulation of the motion and voice activated lens of the image capturing device. A password manager generates a unique password for the legal guardians, so as to enable access to the image capturing device.

The system and method also provides a predetermined noise capturing and an airborne residue capturing device that detects a predetermined noise signal and an airborne residue in the proximity of the dependent. Upon detection of the predetermined noise, such as a gunshot, a message requesting assistance is relayed to an emergency responder, or the legal guardians, or both. Upon detection of airborne residue, such as gunpowder, a message requesting assistance is relayed to the emergency responder, or the legal guardians, or both. The emergency responder is given access to the image capturing devices through the two-way communication network to view and communicate with the dependent.

The system and method also provides multiple remote notarization units that allow for generation, verification, and recorded collection of signatory data between a signatory and a. notary. The remote notarization units enable the signatory to perform remote notary transactions while communicating with the notary through the two-way communication network on the image capturing device. The signatory data can include a video of the signatory giving an oath and electronically signing the document in real time. The notary can record the signatory data for future reference.

Introducing a first embodiment of the invention, the present invention consists of a system for multi-user security monitoring and remote notarization, comprising:
  an image capturing device operable to capture an image and an audio signal of a dependent, the image capturing device comprising a motion and voice activated lens with an algorithm, the motion and voice activated lens tracking the motion and the voice of the dependent, whereby the algorithm is programmable to control articulation of the motion and voice activated lens;
  a two-way communication network operable with the motion and voice activated lens, the two-way communication network comprising a transmitter and a receiver, the two-way communication network enabling multiple legal guardians to remotely observe and communicate with the dependent through a mobile communication device;

a password manager operatively connected to the image capturing device, the password manager controlling access to the image capturing device, the password manager providing a unique password to the legal guardians to enable access to the image capturing device, whereby unauthorized users are restricted from viewing and communicating with the dependent;

a predetermined noise capturing device detecting a predetermined noise in the proximity of the dependent, the predetermined noise capturing device relaying a first emergency message through the transmitter to an emergency responder and the legal guardians upon detection of the predetermined noise, whereby the two-way communication network enables the emergency responder and the legal guardians to communicate with the dependent in real time;

an airborne residue capturing device detecting airborne residue in the proximity of the dependent, the airborne residue capturing device relaying a second emergency message through the transmitter to the emergency responder and the legal guardians upon detection of the airborne residue, whereby the two-way communication network enables the emergency responder and the legal guardians to communicate with the dependent in real time; and multiple remote notarization units operatively connected to the image capturing device, the two-way communication network, and the password manager, the remote notarization units operable to record a video of a signatory generating a signatory data with a stylus pen or a finger, the remote notarization units further being operable to enable a notary to verify the identity of the signatory, whereby the image capturing device and the two-way communication network enable the signatory and the notary to visually and audibly communicate in real time.

In a second aspect, the image capturing device comprises a camera, a microphone, a viewing monitor, a webcam, a speaker, and a digital display.

In another aspect, the password manager generates multiple user login accounts for the legal guardians.

In another aspect, the image capturing device is operable in at least one of the following: a home, a school, a nursery, a retirement home, a court room, a correctional facility, and a vehicle.

In another aspect, the system comprises a one-way communication, the one-way communication enabling at least one guest, or the legal guardians, to view a host and the dependent, incognito.

In another aspect, the mobile communication device includes at least one of the following: a smart phone, a tablet, a laptop, a computer, a kiosk, a watch, bracelet, neck charm or other wearable mobile device.

In another aspect, the mobile communication device may include a geolocalization (e.g., GPS) tracker configured to send the location of a user to alert one or more remote terminals associated to one or more legal guardians, first responders or central monitoring centers of an active threat or crime in progress.

In another aspect, the mobile communication device is configured to allow a user to send notifications informative of assistance needed to the aforementioned remote terminals. In some embodiments, these notifications may trigger the recording function and/or two-way communication. In some embodiments, the user may further receive alerts of active threats and/or crimes in progress within the vicinity, based on their current location as given by the geolocalization tracker.

In another aspect, the emergency messages comprise audio teed and video feed.

In another aspect, the motion and voice activated lens is configured to perpetually orient towards the motion and sound of the dependent.

In another aspect, the notary verifies the identity of the signatory by viewing the signatory on a video call, or viewing a user ID of the signatory.

In another aspect, the predetermined noise includes at least one of the following: broken glass, gunshots, smoke alarm siren, an explosion, and a code word.

In another aspect, the airborne residue includes at least one of the following: gunpowder, smoke, and dust.

In another aspect, the emergency messages comprise a push-type alert, a phone call, an email, a text, and a facsimile.

In another aspect, the emergency message comprises an exact location of the dependent.

Introducing another embodiment of the invention, the present invention consists of a method for multi-user security monitoring and remote notarization, comprising:

positioning an image capturing device proximally to a dependent, the image capturing device comprising a motion and voice activated lens, the motion and voice activated movable lens operable to track a motion and a voice;

interfacing the motion and voice activated lens with an algorithm, whereby articulation of the lens is programmable;

capturing an image and an audio signal of the dependent through the motion and voice activated movable lens;

tracking the movement of the dependent through the motion and voice activated movable lens;

authorizing access, through a password manager, to view the dependent through the image capturing device for multiple legal guardians of the dependent, whereby a unique password is generated for the legal guardians to access the image capturing device;

viewing, by the legal guardians, the dependent through a two-way communication network operable on the image capturing device, whereby the legal guardians and the dependent communicate in real time:

detecting, through a predetermined noise capturing device, a predetermined noise in the proximity of the dependent;

detecting, through an airborne residue capturing device, an airborne residue in the proximity of the dependent;

relaying an emergency message through to an emergency responder and the legal guardians upon detection of the predetermined noise, or the airborne residue, or both, whereby the two-way communication network enables the emergency responder and the legal guardians to communicate with the dependent in real time;

recording, through multiple remote notarization units, a video of a signatory generating a signatory data with a stylus pen or a finger; and verifying, by a notary through the multiple remote notarization units, the identity of the signatory, whereby the image capturing device and the two-way communication network enable the signatory and the notary to visually and audibly communicate in real time.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1, Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a system 100 and method 300 for multi-user security monitoring and remote notarization that allow multiple legal guardians 104 to remotely observe and communicate with a dependent 102 in real time through mobile communication devices. The system 100 and method 300 can provide a predetermined noise and residue capturing device 106 that allows for the detection of predetermined noise signals and airborne residue in the proximity of the dependent 102, triggering an emergency message to an emergency responder; and further provides multiple remote notarization units that allow a signatory and a notary to generate, verify, and record signatory data in real time.

Figure 1:
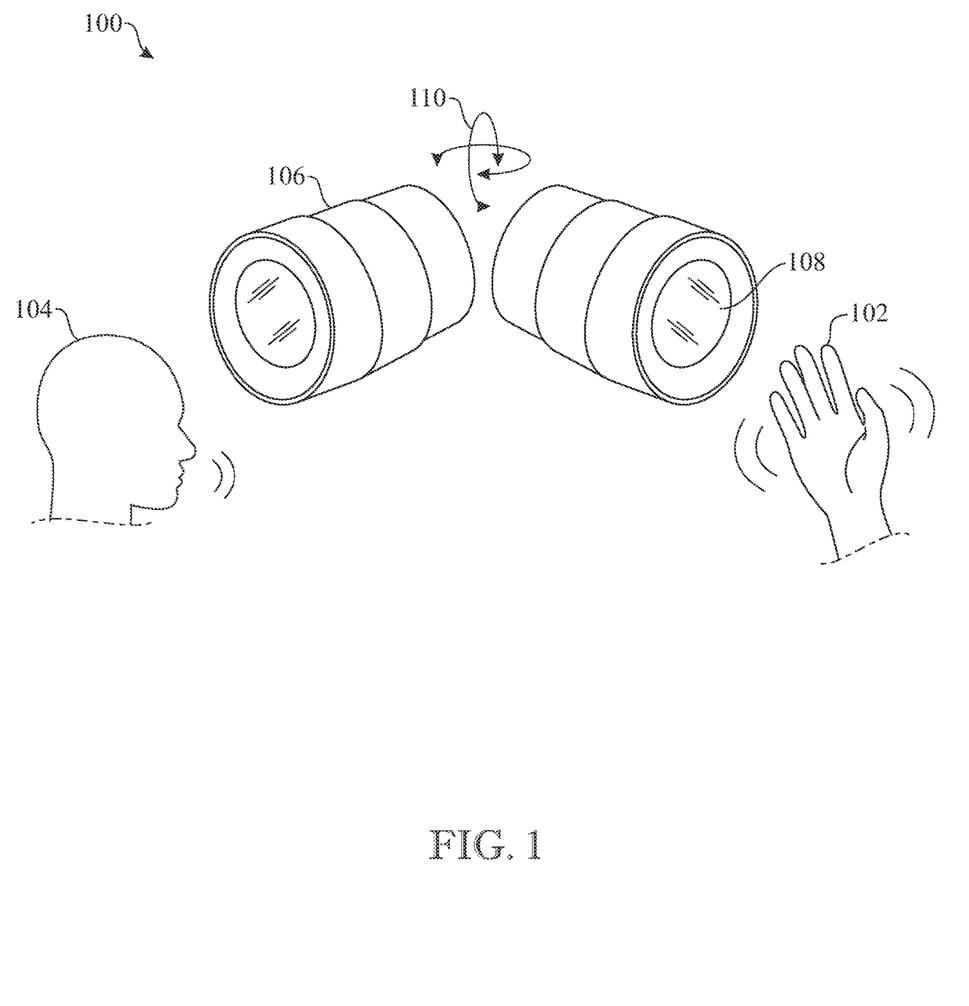
FIG. 1 presents a perspective view of an exemplary system for multi-user security monitoring and remote notarization, showing an image capturing device articulating to follow the motion and sound of a dependent.
Figure 2:
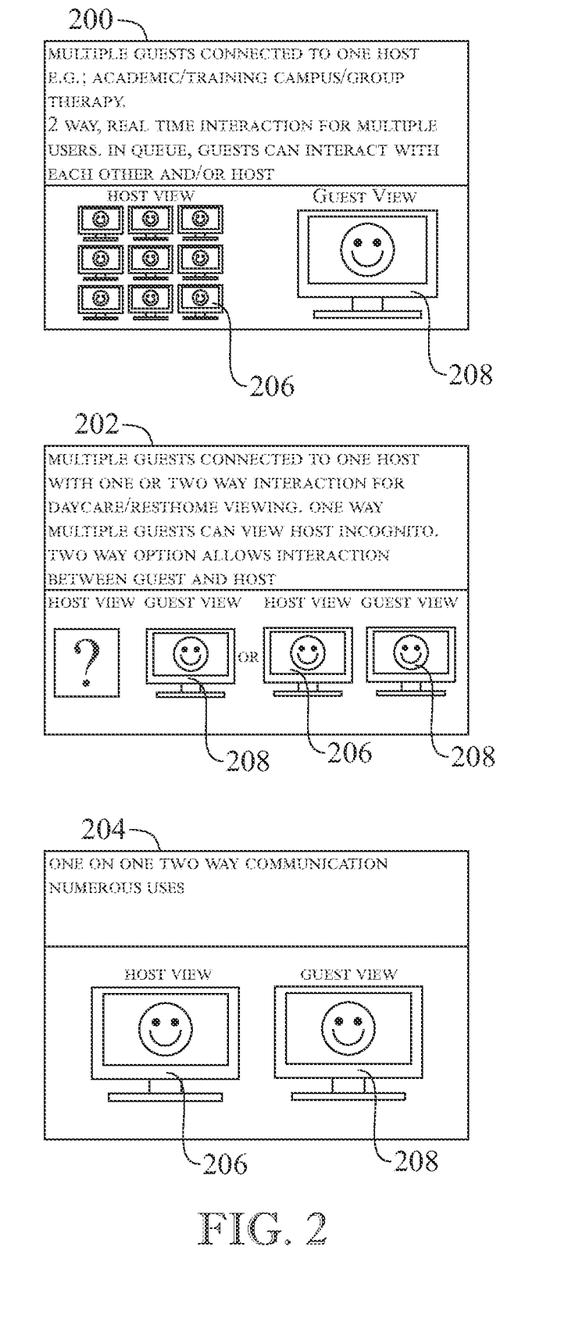
FIG. 2. presents a diagram of two-way and one-way communication networks that enable communications in real time between a guest, a host, legal guardians, and a dependent.

With reference to FIG. 1, the system 100 for multi-user security monitoring and remote notarization can provide a network of image capturing devices 106 that are configured to capture both images and audio signals at a host site 208 (FIG. 2). The image capturing device 106 may include, without limitation, a camera, a microphone, a viewing monitor, a webcam, a speaker, and a digital display. The image capturing device 106, as used in the present invention, captures the image and audio of a dependent 102. Multiple legal guardians 104 who are associated with the dependent 102 receive a unique password that allows access to the image capturing device 106, so as to remotely observe and communicate with the dependent 102 in real time.

The dependent 102 may include a baby, a child, an elderly person, a mentally disabled person, and a prisoner. The legal guardian may include a parent or authority who is legally in charge of, or responsible for, the dependent 102. However, in alternative embodiments of the system 100, any entity associated with, or responsible for, another entity may utilize the image capturing device 106. For example, a prison guard may monitor and communicate with a prisoner through the image capturing device 106 in real time. In other examples, the system may be used to remotely monitor house arrests or visitation services (prisons, rest homes, etc.).

Thus, it is envisioned that the image capturing device 106 is operable in at least one of the following: a home, a workplace, a school, a nursery, a retirement home, a court room, a correctional facility, public transportation (e.g., bus, train, airplane) and a vehicle. In other examples, the legal guardians 104 views images of dependents 102 in a rest home that allows live video visits; a school; a daycare, an academic campus; a Meet and Greet (especially celebrity) or "Make a Wish"; a dating site, a correctional facility, and a civil court. Further, the system 100 can include the option to allow designated legal guardians 104 remote access through the image capturing device 106 for remote health and welfare checks. Additionally, the system 100 can be installed in vehicles, allowing to monitor new drivers. Monitoring can be conducted in real time, Turning again to FIG. 1, the image capturing device 106 may include a motion and voice activated lens 108 that detects motion and audio signals of the dependent 102 and articulates to track the dependent 102. The motion and voice activated lens 108 may rotate, pivot, and laterally slide to follow and capture the image and sound of the dependent 102.

In one embodiment, the motion and voice activated lens 108 perpetually articulates towards the motion and sound of the dependent 102, so as to capture real time motion and sound therefrom. In some embodiments, the motion tracking means may be performed through a motion detector that is operatively connected to the motion and voice activated lens 108. Further, the audio signal tracking means may be performed through a microphone array, as known in the art.

Turning now to FIG. 2, the image capturing device 106 can be configured with a two-way communication network that enables communications in real time between at least one guest 206, at least one host 208, multiple legal guardians 104, and a dependent 102. The two-way communication network also allows the legal guardians 104 to communicate with each other. The two-way communication network allows the dependent 102, the legal guardians 104, and other parties discussed below to transmit information between each other in real time. The two-way communication network may include, without limitation, a radio, an Internet connection, a text, a real time video, and a video IP connection.

However, in other embodiments, the image capturing device 106 is configured with a one-way communication that allows the guest 206, or legal guardians 104, to view the host incognito. Thus, the image capturing device 106 is configured with both, a two-way and a one-way communication network that work together to enable selective communication protocols between the legal guardians and the dependent. In this configuration, the image capturing device 106 switches between the two-way and the one-way communication networks. The legal guardians may select the type of communications, as deemed appropriate.

Turning again to FIG. 2, the two-way communication network enables various combinations of communication between legal guardians 104, hosts 208, dependents 102, and other entities. This can include two-way dialogue. In a first embodiment of a two-way communication 200, multiple legal guardians 104, or guests 206, connect to one host 208, e.g., Academic Training Campus, Group Therapy. Two-way interactions occur in real time for multiple guests simultaneously. The guests queue in line to interact with each other and/or the host.

In a second embodiment of a two-way communication network 202, multiple guests connect to one host through one-way or two-way interaction for daycare/rest home viewing. One-way guests can view the host incognito. The two-way option allows for interaction between the guest and the host. In a third embodiment of a two-way communication network 204, the guests and hosts can have one-on-one communications, multiple times. In any case, the image capturing device 106 allows for efficient, and selective viewing, communicating between guests 206, hosts 208, legal guardians 104, and dependent 102.

As illustrated in FIG. 1, the system 100 may utilize an algorithm 110 for controlling the orientation and movement of the motion and voice activated lens 108. The algorithm 110 is programmable to enable the legal guardian or an administrator to control the precise articulation of the motion and voice activated lens 108. For example, the motion and voice activated lens 108 can be programmed to orient to one side of the room during the daylight hours, and rotate to view outside a window during the nighttime hours. In one non-limiting embodiment, the legal guardians 104 can remotely program the motion and voice activated lens 108 through a mobile communication device, such as a smart phone.

The system utilizes various security features to prevent unauthorized access to the image capturing device. In one embodiment, the algorithm may include a high security software having encryption capabilities that help to prevent compromises to the system 100. In another embodiment, user identification is mandatory to access the image capturing device 106. This also works to eliminate SPAM and unwanted callers. An online verification company, such as miiCard™ may also be used. The system 100 also verifies all downloads of updates and all programming commands.

It is significant to note that the mobile communication device may be used by the legal guardian to view the dependent 102, speak with the dependent 102, and program the motion of the motion and voice activated lens 108. The mobile communication device may include, without limitation, a smart phone, a tablet, a laptop, a computer, and a kiosk. However, in other embodiments, a dedicated, remote camera, kiosk, or terminal may be used to view the dependent 102, speak with the dependent 102, and program the motion of the motion and voice activated lens 108.

Thus in one exemplary use of the system 100, a secure, two-way security camera, or possible even a one-way camera for incognito viewing, is positioned to capture the image of the dependent 102 in a room, region, or vehicle. The system 100 allows remote login and viewing of the images captured by the cameras from multiple user accounts of legal guardians 104. In this manner, multiple users can view the images from their respective mobile communication devices for two-way communication or one-way incognito viewing of the host and dependent 102. These viewing and communicating capacities can be useful when multiple legal guardians 104 require monitoring the dependent 102 simultaneously and in real time; such as a father and mother of a child.

Those skilled in the art will recognize that such a two-way video surveillance communications system, as taught here, has a multitude of uses and can change the way people communicate. High security encrypted download combined with user positive identification forms a trusted communication and/or surveillance tool. Additionally, market viewing monitors and webcams to interface with software and existing computers/laptops/tablets, Smart TVs/phones/watches, monitors, for WebTV call/surveillance use. Other future technologies can also be integrated into the present system 100.

In some embodiments, the system 100 may include a password manager that is operatively connected to the image capturing device 106 to regulate access to the image capturing device 106. For this purpose, the password manager generates a unique password that is provided to the legal guardians 104. The password generated by the password manager allows the legal guardians 104 to access the image capturing device 106 for viewing, communicating, and programming. By requiring a password, unauthorized users are restricted from viewing and communicating with the dependent 102.

In one non-limiting embodiment, the password manager generates multiple user login accounts for the legal guardians 104. The multiple accounts can be useful when multiple legal guardians 104 have different authorization requirements. For example, a first legal guardian may be authorized to communicate with the dependent 102 twenty-four hours a day; while a second legal guardian may be authorized to communicate with the dependent 102 only during emergencies, or during school hours. Thus, the unique password allows each legal guardian, or other entity, to communicate with the dependent 102 accordingly.

In some embodiments, the system 100 also provides a predetermined noise capturing device that detects a predetermined noise signal in the proximity of the dependent 102. The predetermined noise may include, without limitation, broken glass, gunshots, smoke alarm siren, an explosion and a code word. Upon detection of the predetermined noise, a first emergency message that requests assistance is relayed to an emergency responder, or the legal guardians 104, or both.

The first emergency message indicates the exact location of the dependent 102, the type of emergency, the best route to reach the dependent 102, and other pertinent information. The first emergency message may include an audio feed and/or a video feed. Further, the emergency messages may include a push-type alert, a phone call, an email, a text, and a facsimile. The emergency messages are useful for mass communication to emergency responders and facility occupants. For example, an emergency room of a hospital can view real time events which empowers them to command incidents effectively.

The system 100 also provides an airborne residue capturing device that detects an airborne residue in the proximity of the dependent 102. The airborne residue may include, without limitation, gunpowder, smoke, and dust. Upon detection of airborne residue, such as gunpowder, a message requesting assistance is relayed to the emergency responder, or the legal guardians 104, or both. The second emergency message may include an audio feed and/or a video feed. The emergency responder is given access to the image capturing device 106 through the two-way communication network to view and communicate with the dependent 102.

In another exemplary use of the two-way communications accessible through the noise and residue capturing device, the communications between emergency responder and dependent can include voice operations. Such voice operation allows users to alert POCs/ERs to their emergency. Further, surveillance cameras turn on immediately if the two-way surveillance communication system application is installed. For example, someone is in need of help so they say a command of their choosing, "need ambulance". The sound detector alerts Emergency POCs. If user also has the two-way surveillance communication system application installed on their device, the cameras activate and allows 2-way communication.

The system 100 also provides multiple remote notarization units that introduce the function of remote notarization to the above discussed monitoring features. The remote notarization units may be operatively connected to the image capturing device 106, the two-way communication network, and the password manager. The remote notarization units may include remote kiosks, computers, or nodes that facilitate the generation, verification, and recorded collection of signatory data between a signatory and a notary. The signatory may include the legal guardian. Though in other embodiments, another entity may serve as the signatory.

In one embodiment, the remote notarization units enable the signatory to perform remote notary transactions while communicating with a notary through the two-way communication network of the image capturing device 106. Thus, the image capturing device 106 and the two-way communication network enable the signatory and the notary to visually and audibly communicate in real time. This allows the signatory to ask questions to the notary, and also allows the notary to hear a verbal oath by the signatory, and view the signatory sign the document.

In one non-limiting embodiment, the signatory can electronically sign the document with a stylus pen or finger. However, the remote notarization units also implement electronic signature devices, digital certificates, electronic documents, electronic biometric devices, electronic audio and visual software/hardware, electronic payment systems for human interface and verification. In one possible embodiment, Docusign™ is utilized for signing the documents.

In one non-limiting embodiment, the signatory data can include a real time video of the signatory swearing an oath and electronically signing the document with a stylus pen or a finger. Those skilled in the art will recognize that verification the identity of the signatory is a primary feature of notarizing a document. Thus, the remote notarization units enable the notary to view the signatory singing and swearing in real time, so as to verify the electronic signature, verbal oath, or other signatory act. In one non-limiting embodiment, the notary verifies the identity of the signatory by viewing the signatory on a video call, or viewing a user ID of the signatory. This helps to prevent unauthorized signatures and repudiation of the signed document by the signatory.

Further, the remote notarization units enable the notary to record and store the signatory data for future reference. A database, server, or cloud may be used to store the recorded signatory act. It is significant to note that, as with the legal guardians 104, the remote notarization units enable may require the signatory to have a password before accessing the image capturing device 106 for two-way communications between signatory and notary.

In one exemplary use, a notary is located on end, or terminal, of the image capturing device 106. The terminal includes a camera and is prepared to receive a signature (e.g. an electronic signature) entered by the notary. A signatory can be located on a second remote terminal, which includes a camera and is prepared to receive a signature provided by the signatory. Further, over the two-way communication network of the image capturing device 106, the notary can notarize a document provided by the signatory by having the notary see the signatory over a video call, view the user ID over the call, or simply having the signatory show it to the notary. Then, both the signatory and the notary may enter their signatures to notarize a document.

Figure 3:
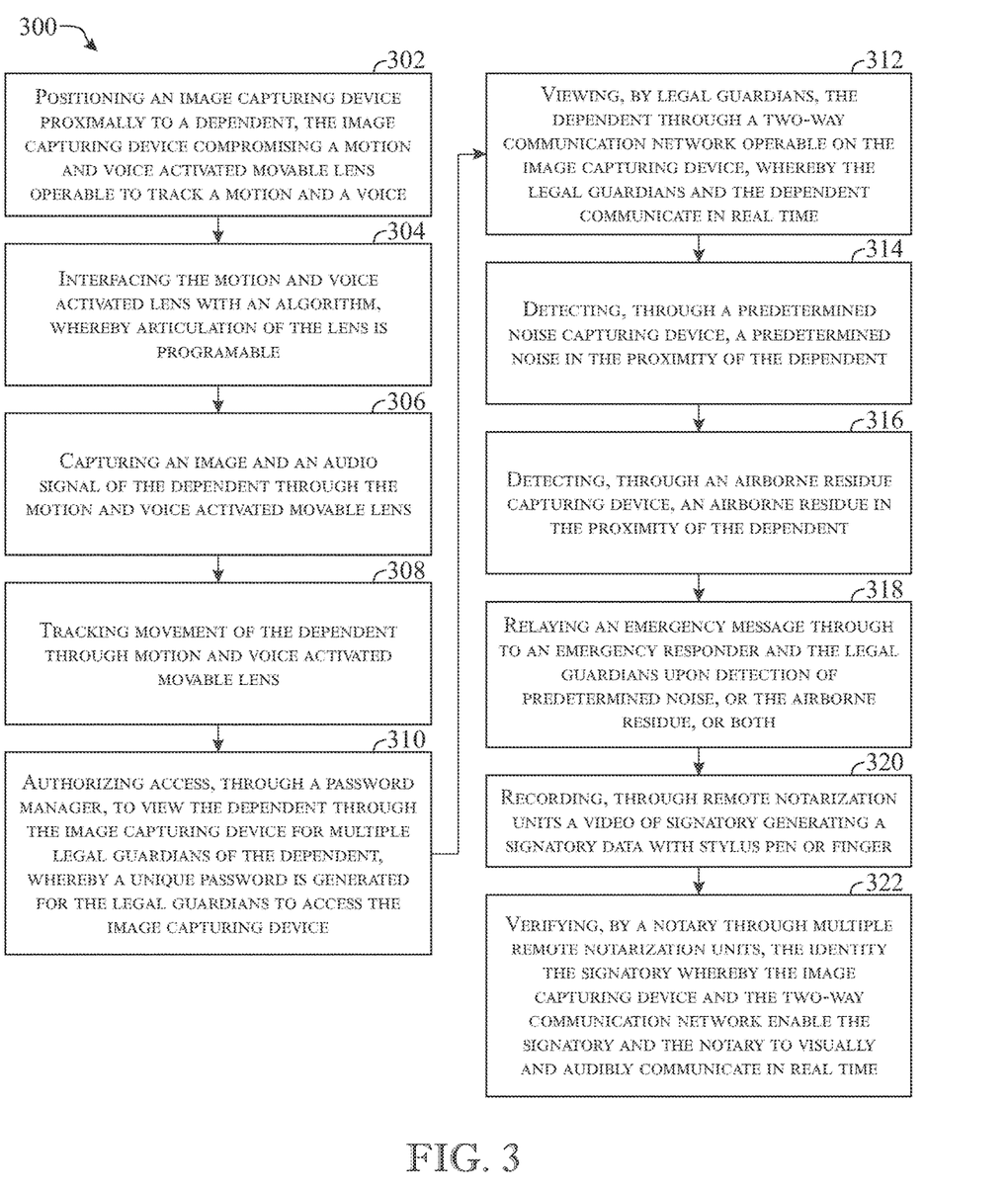
FIG. 3 illustrates a flowchart of an exemplary method for multi-user security monitoring and remote notarization.

The illustration of FIG. 3 shows a flowchart of an exemplary method 300 for multi-user security monitoring and remote notarization. The method 300 may include an initial Step 302 of positioning an image capturing device proximally to a dependent, the image capturing device comprising a motion and voice activated lens, the motion and voice activated movable lens operable to track a motion and a voice. The method 300 may further comprise a Step 304 of interfacing the motion and voice activated lens with an algorithm, whereby articulation of the lens is programmable.

In some embodiments, a Step 306 includes capturing an image and an audio signal of the dependent through the motion and voice activated movable lens. A Step 308 comprises tracking the movement of the dependent through the motion and voice activated movable lens. A Step 310 includes authorizing access, through a password manager, to view the dependent through the image capturing device for multiple legal guardians of the dependent, whereby a unique password is generated for the legal guardians to access the image capturing device.

in some embodiments, a Step 312 may include viewing, by the legal guardians, the dependent through a two-way communication network operable on the image capturing device, whereby the legal guardians and the dependent communicate in real time. A Step 314 comprises detecting, through a predetermined noise capturing device, a predetermined noise in the proximity of the dependent. The method 300 may further comprise a Step 316 of detecting, through an airborne residue capturing device, an airborne residue in the proximity of the dependent.

A Step 318 includes relaying an emergency message through to an emergency responder and the legal guardians upon detection of the predetermined noise, or the airborne residue, or both, whereby the two-way communication network enables the emergency responder and the legal guardians to communicate with the dependent in real time, Another Step 320 comprises recording, through multiple remote notarization units, a video of a signatory generating a signatory data with a stylus pen or a finger. A final Step 322 includes verifying, by a notary through the multiple remote notarization units, the identity of the signatory, whereby the image capturing device and the two-way communication network enable the signatory and the notary to visually and audibly communicate in real time.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

In some embodiments the method or methods described above may be executed or carried out by a computing system including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that certain task is to be executed by the computing system, such as requesting the computing system to display any of the above described information, or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Alternative embodiments are contemplated to those described herein. For instance, it is contemplated that the two-way communications video surveillance system may be a standalone product. Similarly, the notary function may be a separate component for additional use. Furthermore, the emissions/sound detector can be a separate component for use in situations of active threat and/or crime in progress. Also similarly, the motion/voice activated lens may be provided as a separate component.

In another example, the end-user mobile communication device carried by the dependent user may include a geolocalization (e.g., GPS) tracker configured to send the location of a user to alert one or more remote terminals associated to one or more legal guardians, first responders or central monitoring centers of an active threat or crime in progress. In some embodiments, the dependent user's mobile communication device is configured to allow the dependent user to send notifications informative of assistance needed to the aforementioned remote terminals. In some embodiments, these notifications may trigger the recording function and/or two-way communication. In some embodiments, the user may further receive alerts of active threats and/or crimes in progress within the vicinity, based on their current location as given by the geolocalization tracker; the alerts may be received, for instance and without limitation, via a software app, text, call, email, etc. Alerts may prevent a user from unknowingly entering an active threat location (e.g., an active shooter situation at school, work, a movie theater, etc.)

In some embodiments the methods, tasks, processes, and/or operations described herein may be automatically effected, executed, actualized, and/or carried out by a computing system including a tangible computer-readable storage medium, also described herein as a storage machine, that holds machine-readable instructions executable by a logic machine (i.e. a processor or programmable control device) to effect, execute, actualize, carry out, provide, implement, perform, and/or or enact the above described methods, processes, operations, and/or tasks. When such methods, operations, and/or processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that a certain task is to be executed by the computing system, such as requesting the computing system to display any of the above described information, or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

As a non-limiting example, the disclosure teaches action by a processor o execute a "determining step" that cannot be done mentally, for example by determining any of the disclosed data, informatic values, or states by automatically tracking other data, informatic values, or states. For example, the disclosed systems and methods may automatically determine a second (dependent) state or value by automatically tracking a first (independent) state or value, the second state automatically depending on the first state.

The disclosure includes the practical application of a processor (logic machine), and this practical application may include the receiving of an input through a graphical user interface (GUI) such as a user selection to execute one or more tasks or operations. Such a practical application may include the automatic operation of one or more data- or state-determining tasks in response to such a user selection or user input. The practical application as such may automatically execute any of the herein operations based on automatically determining any of the disclosed values, data, informatics, or states.

It is to be understood that the disclosed systems and methods provide a specific manner of automatically executing or actualizing the disclosed tasks, operations, or methods in a manner that is an improvement over known systems and solutions. In addition to being a practical application of machines, the disclosure includes an inventive concept that is not anticipated or obvious in view of known systems and methods.

Furthermore, the systems and methods disclosed herein are configured to solve technical problems in computing in the field of the disclosure as set forth in the background section, where the problems have attributes that hinder, limit, and/or prevent the features, aspects, or elements disclosed herein from being enabled and/or implemented. Therefore the disclosed technical solutions eliminate or alleviate these problems and positively contribute to the technical abilities of existing computing systems and methods.

As a non-limiting; example of such a practical application, embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on one or more standalone computers, partly on one or more standalone computers, as a stand-alone software package, partly on one or more standalone computers and partly on one or more remote computers, partly on one or more standalone computers and partly on one or more distributed computing environments (such as a cloud environment), partly on one or more remote computers and partly on one or more distributed computing environments, entirely on one or more remote computers or servers, or entirely on one or more distributed computing environments. Standalone computers, remote computers, and distributed computing environments may be connected to each other through any type of network or combination of networks, including local area networks (LANs), wide area networks (WANs), through the Internet (for example using an Internet Service Provider), or the connection may be made to external computers. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to schematic flowchart illustrations and/or block diagrams of methods, apparatus (systems), functions, and computer program products according to embodiments of the invention. It will be understood that each block of the flowchart illustrations and/or block diagrams, and combinations of blocks in the flowchart illustrations and/or block diagrams or functions, can be implemented by computer readable program instructions. Functions, including policy functions, are groups of computer readable program instructions grouped together that can be invoked to complete one or more tasks.

These computer readable program instructions may be provided to one or more processors of one or more general purpose computers, special purpose computer, or other programmable data processing apparatus to produce a machine, such that the instructions, which execute via the processors of the one or more computers or other programmable data processing apparatus, create means for implementing the functions/acts specified in the flowchart and/or block diagram block or blocks. These computer readable program instructions may also be stored in one or more computer readable storage mediums that can direct one or more computers, programmable data processing apparatuses, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto one or more computers, other programmable data processing apparatus, or other devices to cause a series of operational steps to be performed on the one or more computers, other programmable apparatuses or other device to produce a computer implemented process, such that the instructions which execute on the computers, other programmable apparatus, or other devices implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A system for multi-user security monitoring and remote notarization, comprising:
    an image capturing device operable to capture an image and an audio signal of a dependent, the image capturing device comprising:
    a motion and voice activated lens with an algorithm, the motion and voice activated lens tracking the motion and the voice of the dependent, whereby the algorithm is programmable to control articulation of the motion and voice activated lens;
        a two-way communication network operable with the motion and voice activated lens, the two-way communication network comprising a transmitter and a receiver, the two-way communication network enabling multiple legal guardians to remotely observe and communicate with the dependent through a mobile communication device;
        a password manager operatively connected to the image capturing device, the password manager controlling access to the image capturing device, the password manager providing a unique password to the legal guardians to enable access to the image capturing device, whereby unauthorized users are restricted from viewing and communicating with the dependent;
        a predetermined noise capturing device detecting a predetermined noise in a proximity of the dependent, the predetermined noise capturing device relaying a first emergency message through the transmitter to an emergency responder and the legal guardians upon detection of the predetermined noise, whereby the two-way communication network enables the emergency responder and the legal guardians to communicate with the dependent in real time;
        an airborne residue capturing device detecting airborne residue in the proximity of the dependent, the airborne residue capturing device relaying a second emergency message through the transmitter to the emergency responder and the legal guardians upon detection of the airborne residue, whereby the two-way communication network enables the emergency responder and the legal guardians to communicate with the dependent in real time; and
    multiple remote notarization units operatively connected to the image capturing device, the two-way communication network, and the password manager, the remote notarization units operable to record a video of a signatory generating a signatory data with a stylus pen or a finger, the remote notarization units further being operable to enable a notary to verify the identity of the signatory, whereby the image capturing device and the two-way communication network enable the signatory and the notary to visually and audibly communicate in real time.

2. The system of claim 1, wherein the image capturing device comprises a camera, a microphone, a viewing monitor, a webcam, a speaker, and a digital display.

3. The system of claim 1, wherein the password manager generates multiple user login accounts for the legal guardians.

4. The system of claim 1, wherein the image capturing device is operable in at least one of the following: a home, a school, a nursery, a retirement home, a court room, a correctional facility, and a vehicle.

5. The system of claim 1, wherein the system comprises a one-way communication, the one-way communication enabling at least one guest, or the legal guardians, to view a host and the dependent, incognito.

6. The system of claim 1, wherein the mobile communication device includes at least one of the following: a smart phone, a tablet, a laptop, a computer, a kiosk, a watch, bracelet, neck charm or other wearable mobile device.

7. The system of claim 1, wherein the mobile communication device may include a geolocalization (e.g., GPS) tracker configured to send a location of a user to alert one or more remote terminals associated to one or more legal guardians, first responders or central monitoring centers of an active threat or crime in progress.

8. The system of claim 1, wherein the mobile communication device is configured to allow a user to send notifications informative of assistance needed to the remote terminals, triggering a recording function and/or two-way communication, and sending alerts to a user of active threats and/or crimes in progress within the vicinity, based on their current location as given by a geolocalization tracker.

9. The system of claim 1, wherein the emergency messages comprise audio feed and video feed.

10. The system of claim 1, wherein the motion and voice activated lens is configured to perpetually orient towards the motion and sound of the dependent.

11. The system of claim 1, wherein the notary verifies the identity of the signatory viewing the signatory on a video call, or viewing a user ID of the signatory.

12. The system of claim 1, wherein the predetermined noise includes at least one of the following: broken glass, gunshots, smoke alarm siren, an explosion, and a code word.

13. The system of claim 1, wherein the airborne residue includes at least one of the following: gunpowder, smoke, and dust.

14. The system of claim 1, wherein the emergency messages comprise a push-type alert, a phone call, an email, a text, and a facsimile.

15. The system of claim 1, wherein the emergency message comprises an exact location of the dependent.

16. A method for multi-user security monitoring and remote notarization, comprising:
- positioning an image capturing device proximally to a dependent, the image capturing device comprising a motion and voice activated lens, the motion and voice activated movable lens operable to track a motion and a voice;
- interfacing the motion and voice activated lens with an algorithm, whereby articulation of the lens is programmable;
- capturing an image and an audio signal of the dependent through the motion and voice activated movable lens;
- tracking the movement of the dependent through the motion and voice activated movable lens;
- authorizing access, through a password manager, to view the dependent through the image capturing device for multiple legal guardians of the dependent, whereby a unique password is generated for the legal guardians to access the image capturing device;
- viewing, by the legal guardians, the dependent through a two-way communication network operable on the image capturing device, whereby the legal guardians and the dependent communicate in real time;
- detecting, through a predetermined noise capturing device, a predetermined noise in the proximity of the dependent;
- detecting, through an airborne residue capturing device, an airborne residue in the proximity of the dependent;
- relaying an emergency message through to an emergency responder and the legal guardians upon detection of the predetermined noise, or the airborne residue, or both, whereby the two-way communication network enables the emergency responder and the legal guardians to communicate with the dependent in real time;
- recording, through multiple remote notarization units, a video of a signatory generating a signatory data with a stylus pen or a finger; and
- verifying, by a notary through the multiple remote notarization units, the identity of the signatory, whereby the image capturing device and the two-way communication network enable the signatory and the notary to visually and audibly communicate in real time.

17. The method of claim 16, wherein the image capturing device comprises a camera, a microphone, a viewing monitor, a webcam, a speaker, and a digital display.

18. The method of claim 16, wherein the password manager generates multiple user login accounts for the legal guardians.

19. The method of claim 16, wherein the image capturing device is operable in at least one of the following: a home, a school, a nursery, a retirement home, a court room, a correctional facility, and a vehicle.

20. A method for multi-user security monitoring and remote notarization, comprising:
- positioning an image capturing device proximally to a dependent, the image capturing device comprising a motion and voice activated lens, the motion and voice activated movable lens operable to track a motion and a voice;
- interfacing the motion and voice activated lens with an algorithm, whereby articulation of the lens is programmable;
- capturing an image and an audio signal of the dependent through the motion and voice activated movable lens:
- tracking the movement of the dependent through the motion and voice activated movable lens;
- authorizing access, through a password manager, to view the dependent through the image capturing device for multiple legal guardians of the dependent, whereby a unique password is generated for the legal guardians to access the image capturing device;
- viewing, by the legal guardians, the dependent through a two-way communication network operable on the image capturing device, whereby the legal guardians and the dependent communicate in real time;
- detecting, through a predetermined noise capturing device, a predetermined noise in the proximity of the dependent;
- detecting, through an airborne residue capturing device, an airborne residue in the proximity of the dependent;
- relaying an emergency message through to an emergency responder and the legal guardians upon detection of the predetermined noise, or the airborne residue, or both, whereby the two-way communication network enables the emergency responder and the legal guardians to communicate with the dependent in real time;
- recording, through multiple remote notarization units, a video of a signatory generating a signatory data with a stylus pen or a finger; and
- verifying, by a notary through the multiple remote notarization units, the identity of the signatory, whereby the image capturing device and the two-way communication network enable the signatory and the notary to visually and audibly communicate in real time; and
- wherein the image capturing device comprises a camera, a microphone, a viewing monitor, a webcam, a speaker, and a digital display.

* * * * *